(12) United States Patent
Walsh et al.

(10) Patent No.: US 6,228,405 B1
(45) Date of Patent: *May 8, 2001

(54) PROCESS FOR PREPARING STORAGE STABLE PAR-FRIES

(75) Inventors: Belle Cromwell Walsh, Cincinnati; Jeffrey John Kester, West Chester; Kyle McLennan Taylor, Mason; Herbert Thomas Young, Cincinnati, all of OH (US); Michael Robert Sevenants, Newport, KY (US); Joseph James Elsen; David Thomas Biedermann, both of Cincinnati, OH (US)

(73) Assignee: The Procter & Gamble Company, Cincinnati, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/967,262

(22) Filed: Nov. 7, 1997

Related U.S. Application Data

(63) Continuation of application No. 08/639,811, filed on Apr. 29, 1996, now abandoned.

(51) Int. Cl.⁷ ...................................................... A23L 1/217
(52) U.S. Cl. ........................... 426/241; 426/438; 426/637
(58) Field of Search .................................. 426/438, 441, 426/241, 637

(56) References Cited

U.S. PATENT DOCUMENTS

| | | |
|---|---|---|
| 2,831,854 | 4/1958 | Tucker . |
| 2,962,419 | 11/1960 | Minich . |
| 3,397,993 | 8/1968 | Strong . |
| 3,579,548 | 5/1971 | Whyte . |
| 3,600,186 | 8/1971 | Mattson . |
| 3,649,305 | 3/1972 | Wilder . |
| 3,865,964 | 2/1975 | Kellermeier ........................ 426/307 |
| 3,932,532 | 1/1976 | Hunter . |
| 3,963,699 | 6/1976 | Rizzi . |
| 3,968,265 | 7/1976 | Shatila et al. ........................ 426/550 |
| 4,005,195 | 1/1977 | Jandacek . |
| 4,109,012 | 8/1978 | Bates ..................................... 426/302 |
| 4,109,020 | 8/1978 | Gorfin ................................... 426/241 |
| 4,219,575 | 8/1980 | Saunders ............................. 426/242 |
| 4,254,153 | * 3/1981 | Ross et al. ........................ 426/637 X |
| 4,325,295 | 4/1982 | Caridis et al. ......................... 99/339 |
| 4,456,624 | 6/1984 | Glantz .................................... 426/96 |
| 4,508,746 | 4/1985 | Hamm ................................... 426/601 |
| 4,517,360 | 5/1985 | Volpenhein ........................... 536/119 |
| 4,518,772 | 5/1985 | Volpenhein ........................... 536/119 |
| 4,542,030 | 9/1985 | Haury et al. .......................... 426/262 |
| 4,551,340 | 11/1985 | El-Hag .................................. 426/437 |
| 4,579,743 | 4/1986 | Hullah .................................. 426/262 |
| 4,582,927 | 4/1986 | Fulcher ................................. 560/201 |
| 4,590,080 | 5/1986 | Pinegar ................................ 426/441 |
| 4,632,838 | 12/1986 | Doenges .............................. 426/441 |
| 4,840,815 | 6/1989 | Meyer .................................. 426/611 |
| 4,861,613 | 8/1989 | White ................................... 426/611 |
| 4,888,195 | 12/1989 | Huhn .................................... 426/601 |
| 4,888,196 | 12/1989 | Ehrman ................................ 426/601 |
| 4,900,576 | 2/1990 | Bonnett ................................ 426/438 |
| 4,931,296 | 6/1990 | Shanbhag ............................ 426/243 |
| 5,000,970 | 3/1991 | Shanbhag ............................ 426/296 |
| 5,104,678 | 4/1992 | Yang .................................... 426/601 |
| 5,242,699 | 9/1993 | Bednar ................................ 426/302 |
| 5,279,840 | 1/1994 | Baisier ................................. 426/102 |
| 5,288,512 | 2/1994 | Seiden ................................. 426/607 |
| 5,302,410 | 4/1994 | Calder .................................. 426/637 |
| 5,308,640 | 5/1994 | Baer ..................................... 426/611 |
| 5,648,110 | 7/1997 | Wu et al. .............................. 426/102 |

FOREIGN PATENT DOCUMENTS

| | | |
|---|---|---|
| 27 13 935 | 3/1977 | (DE) . |
| 38 14 587 | 4/1988 | (DE) . |
| 0 026 565 | 1/1980 | (EP) . |
| 0 342 059 | 12/1989 | (EP) . |
| 2215902 | 1/1974 | (FR) . |
| 2 078 081 | 6/1980 | (GB) . |
| 1 579 392 | 11/1980 | (GB) . |
| WO 91/00023 | 1/1991 | (WO) . |
| WO 91/15964 | 10/1991 | (WO) . |
| WO 94/05165 | 3/1994 | (WO) . |

OTHER PUBLICATIONS

"Flavored Vegetable Oils as a Substitute for Beef Tallow in Deep Frying Applications", *Food Technology*, pp. 90–94 (1989).

Peters, J.C. et al., *Journal of the American College of Toxicology*, vol. 10, No. 3, 1991, pp. 357–367.

\* cited by examiner

*Primary Examiner*—Arthur L. Corbin
(74) *Attorney, Agent, or Firm*—Karen F. Clark; James F. Mc Bride

(57) ABSTRACT

A method for preparing frozen par-fried potato strips comprising about 38% to about 58% moisture which remain fresh tasting after storage at about 0° F. (−17.8° C.). The method comprises peeling, trimming and cutting raw potatoes into strips, blanching, and reducing the moisture content of the potato strips to not less than about 60%. The reduced moisture potato strips are then parfried in oil at a temperature of from about 270° F. (132° C.) to about 335° F. (168.3° C.) for a time sufficient to reduce the moisture content of the potato strips to about 38% to about 58% moisture. Thereafter, the parfried potato strips are frozen. The frozen par-fried potato strips are stable (i.e., free from off-flavor development) when stored at 0° F. (−17.8° C.) to about 20° F. (−6.7° C.) for at least 1 month. When cooked, the finished French fries have improved flavor over conventional oven baked fries.

12 Claims, No Drawings

PROCESS FOR PREPARING STORAGE STABLE PAR-FRIES

This is a continuation of application Ser. No. 08/639,811, filed on Apr. 29, 1996, now abandoned.

BACKGROUND OF THE INVENTION

The present invention relates to frozen par-fried potato strips comprising about 38% to about 58% moisture which remain fresh tasting after frozen storage. More particularly this invention relates to parfried potato strips for subsequent reconstitution in an oven prior to consumption. The oven finished fries have substantially the same texture and flavor as deep fried French fries. Further, the oven finished fries show a vast improvement in texture and flavor when compared to commercially prepared par-fries which have been oven finished.

French fries are one of the most popular convenience foods. A wide variety of French fried potato products are produced for both foodservice and home use. French fried potato strips, commonly referred to as "French fries" are served in most fast food restaurants. Most restaurants including large restaurants and consumers prefer to prepare the French fries from the frozen or chilled partially fried product (hereinafter par-fried) rather than go through the procedure of preparing French fries from raw potatoes. The par-fried potatoes are converted by the fast food restaurant or consumer into products such as French fried potatoes and the like.

The use of par-fried potato strips has been widely adopted in fast food restaurants because of the advantages they offer. A few of the recognized advantages associated with the use of chilled and frozen par-fried potato strips are, for example, users know the exact cost, the number of servings and the cost per portion. In addition, use of the frozen par-fried potatoes simplifies storage and inventory control, assures uniform quality from one season to another and reduces labor and time preparation for serving.

A major problem confronted by fast food restaurants is obtaining oven finished French fries which have the taste and texture of fries finished by frying in hot oil. Important features of French fries finished by deep frying are interior moistness and crispness of the crust. However, heretofore, achieving these product characteristics generally has not been possible when the products are oven finished. The oven finished products are typically leathery, tough, drier and less lubricious than French fries finished by frying in hot oil or they tend to be limp and soggy and do not have a crisp crust. These problems are recognized by the consumer and, more particularly, by fast food restaurant operators. As a result fast food restaurants seldom practice/use oven finishing techniques for preparing French fries.

Several methods exist for modifying par-fry processing conditions and/or shapes of parfried and frozen potato strips in an effort to improve taste and textural characteristics when finished by methods other than frying in hot oil. See for example, U.S. Pat. No. 4,109,020 issued to The United States of America and U.S. Pat. No. 4,219,575 issued to AMFAC Foods, Inc. A method for preparing par-fried French fried potato strips for fast food restaurants is taught in U.S. Pat. No. 3,649,305 (Wilder), wherein potato strips are dehydrated to reduce their moisture content by 10%–30%, blanched, par-fried for 30–90 seconds at about 300° F. to about 400° F. (149° C. to about 204° C.) and then frozen.

Another method disclosed in U.S. Pat. No. 3,397,993 (Strong) comprises blanching raw potato strips by steam or hot water and dehydrating the strips in hot air to cause a weight loss of at least 20%. The strips are then par-fried for 30–60 seconds at 375° F. (190° C.) and then frozen to about 0° F. (−17.8° C.).

U.S. Pat. No. 4,590,080 (Pinegar) discloses subjecting potato strips to blanching, par-frying for 50–100 seconds at 360° F. (182° C.), intermediate freezing at −40° F. (−40° C.) for 10 minutes, a longer par-frying for 2–4 minutes at 360° F. (182° C.) and blast freezing.

While these processes may provide limited improvements in taste and texture, they do not provide frozen par-fried potato strips which, when baked in an oven, have substantially the same texture and flavor as deep fried potato strips. Further, there appears to be nothing addressing off flavor development during cold storage.

The present invention consists of a process for producing par-fries that have good texture upon oven finishing. Additionally the present invention consists of a novel process for producing storage stable frozen partially fried potato products, more specifically partially fried potato strips. Typically par-fried potato strips that are intended to be finished by cooking are relatively high in moisture content (e.g., about 60% to 70% moisture). When these parfries are finished by baking in an oven, the bake time is relatively long (e.g., ≧10 minutes) and the finished fries are generally limp and soggy and do not have a crisp crust. To shorten the baking time and improve the surface texture, the parfries can be fried to lower moisture contents (e.g. <60% $H_2O$). However, frozen par-fried potato strips that comprise less than about 60% moisture tend to develop undesirable off-flavors during storage at temperatures between about 0° F. (−17.8° C.) to about 20° F. (−6.7° C.). The off-flavor may be described as "stale" and/or "cardboard". Although this development of off-flavor may not be noticeable when the par-fries are finished by a deep-fry process, it is very noticeable when the fries are oven-finished.

While not wishing to be bound by theory, it is believed that the components responsible for the off-flavors volatilize during the frying process and that any off-flavors in the French fries are masked and/or diluted by the uptake of conditioned oil from the frying kettle. However, in the frozen par-fried potato strips that are finish cooked by an oven baking process, the stale or cardboard off-flavor is not voltailized, masked or diluted and therefore, the stale or cardboard flavor is quite noticeable.

Commercial par-fried potato products are often shipped over long distances and generally must be stored for extended periods of time in the frozen state at about 0° F. (−17.8° C.) prior to ultimate purchase by the consumer. The potato strips are partially fried, then frozen or chilled and packaged. The packaged par-fries are shipped to restaurants, groceries, or ultimate consumers. During shipping and storage and until they are prepared, the products are refrigerated (i.e. held in a chilled state at cold storage temperatures of about 35° F. to about 45° F. (1.7° C. to about 7.2° C.) or held in a frozen state at temperatures below 32° F. (0° C.). Prior to consumption, the chilled or frozen par-fried potato strips are reconstituted (e.g., by finish frying in oil, baking, microwaving) to produce ready-to-eat French fries.

Therefore, it can be seen that providing storage stable par-fries, comprising less than about 60% moisture, that retain good flavor when baked in an oven is a difficult task. Lower temperature storage (e.g., ≦−20° F., −28.9° C.) can extend the storage life somewhat, but is not an ideal solution since lower temperature is not compatible with a typical 0° F. (−17.8° C.) frozen food storage and distribution system in the United States.

Accordingly, it is an object of the present invention to provide frozen paried potatoes which are flavor stable for at least 1 month when stored at about 0° F. (−17.8° C.) to 20° F. (−6.7° C.).

It is another objective of the present invention to provide chilled or frozen par-fried potato strips which remain fresh tasting upon cooking, particularly oven baking, after frozen storage.

It is a further object of the present invention to provide frozen parfried potatoes, which when oven finished, will have substantially the same crispness and textural attributes of French fried potatoes that have been finished by deep frying.

SUMMARY OF THE INVENTION

The present invention is a process for preparing par-fried potato strips that are flavor stable for at least 1 month when stored at about 0° F. (−17.8° C.) to about 20° F. (−6.7° C.). The process comprises the steps of:

(a) reducing the moisture of potato strips to a moisture content of not less than about 60%;

(b) partially frying the reduced moisture potato strips in oil at a temperature of from about 270° F. (132° C.) to about 335° F. (168° C.) for a time sufficient to further reduce the moisture of the potato strips to a moisture content of from about 38% to about 58%; and (c) freezing said partially fried potato strips.

DETAILED DESCRIPTION

The present invention relates to a process for preparing storage stable par-fried frozen potato strips.

As used herein the terms "par-fry" or "par-fried potato strips" refer to potato strips that have been subjected to at least one frying process (e.g., deep frying), but which have not been completely cooked.

As used herein the term "storage stable " refers to par-fried potato strips that develop little or no stale or cardboard off-flavor during storage at about 0° F. (−17.8° C.) to about 20° F. (−6.7° C.) for at least 1 month.

As used herein "cooked" refers to a procedure wherein food products are treated with heat prior to their consumption, such as, for example, by frying, baking, broiling, microwaving, heating in a toaster or toaster oven, etc. Typically, cooking entails reducing the moisture content of the food.

As used herein the term "fat" or "oil" refers to edible fatty substances in a general sense, including natural or synthetic fats and oils consisting essentially of triglycerides, such as, for example soybean oil, corn oil, cottonseed oil, canola oil, sunflower oil palm oil, coconut oil, fish oil, lard and tallow, which may have been partially or completely hydrogenated or modified otherwise, as well as non-toxic fatty materials having properties similar to triglycerides, herein referred to as fat-substitutes, which materials may be partially or fully indigestible. The terms "fat" and "oil" are used interchangeably.

As used herein the term "conditioned oil" refers to oil which has been previously used for frying for such a time that it has developed fried flavor.

As used herein the term "finished" refers to a product that has been subjected to a cooking process (e.g., frying, microwaving, oven baking) to convert it to a ready-to-eat form.

As used herein the term "oven finished" refers to a product that has been subjected to an oven baking process to convert it to a ready-to-eat form. Obviously, the advantages of the invention cannot be realied until the par-fry is cooked, as by baking in an oven such as a forced air convection oven, a hot air impingement oven, a combination of infrared radiation and convection oven, a toaster, toaster oven, a combined microwave and convection oven, or a conventional home oven.

Unless otherwise stated, all percentages, ratios or proportion expressed herein are by weight.

Potato Processing

The present invention reduces the development of stale, cardboard off flavors that occur during the storage of chilled or frozen par-fried potatoes that comprise about 38% to about 58% moisture. The present invention is based in part on the surprising discovery that when potato strips reach about 60% moisture, it is critical to fry the potato strips in oil having a temperature of from about 270° F. (132° C.) to about 335° F. (168° C.) until the potato strips reach a desired moisture level of from about 38% to about 58%.

Another aspect of the present invention is based on the discovery that after from about 1 month to about 3 months of storage at about 0° F. (−17.8° C.) to about 20° F. (−6.7° C.), the French fries that have been finished by baking in an oven using par-fries processed according to the present invention, have significantly better flavor (i.e., less stale or cardboard off-flavor) than French fries prepared from conventionally processed par-fries.

In accordance with the present invention, raw unpeeled white potatoes are obtained for processing. Any variety of potatoes is acceptable, for instance Garnet Chili, Early Rose, Russet Rural, Peach Blow, Early Ohio, Triumph, Kennebec, Merrimack, Delus, Saco, Katahdin, Bounty, Cherokee, Chippewa, Early Gem, Haig, Irish Cobbler, La Rough, Norgold Russet, Norland, Onaway, Pungo, Re La Sorda, Red McGlure, Red Pontiac, Russet Burbank, Russet Sebago, Sebago Superior, Shepody, Viking or White Rose. However, it is preferred to use Russet Burbank or Katahdin potatoes in the practice of this invention to obtain the best combination of internal texture and flavor in the final French fry product. It should be noted that the quality of French fries will vary with the potato used. This variance will occur both between different species of potatoes and the age of the potato within a given species.

The potatoes are washed, peeled, trimmed, sorted, and are cut into strips of a desired size and shape customarily used for French fries. Potatoes may be cut into spiral cut, crinkle-cut and straight cut strips such as shoestring potato strips and thick strips.

In the practice of the present invention it is preferred that the potato strips known in the art as "shoestrings" be used herein. Shoestring potato strips, as used herein refer to potato strips that are from about $3/16$ to about $5/16$ inch square in cross-section and from about 2.5 to about 5 inches in length.

Other potato strips which may be used herein are known in the art as "crinkle cut" strips. Such strips usually average from about $5/16$ to about $½$ inch in cross-section and from about 2 to about 4 inches in length.

Also, straight cut thick potato strips (known as "regular-cut") of from about $5/16$ to about $½$ inch square in cross-section and about 2.5 to about 5 inches in length may be used. Larger potato strips of the type referred to as "steak fries" may also be used. Typically, these potato strips have a rectangular cross-section of about $½$ inch by about $7/8$ inch. After cutting, the strips may be washed to remove surface starch.

The potato strips are blanched according to conventional procedures known in the art. This is done to inactivate enzymes and remove excess free sugars from the surfaces of the cut strips. Typically the strips are blanched by immersion in hot water at a tempera of about 140° F. (60° C.) to about 200° F. (93.3° C.) for about 3 to about 20 minutes depndmg upon strip size. Alternatively, the strips may be blanched in steam, at atmospheric pressure for about 2 to about 10 minutes.

Following the blanching step, the potato strips may be treated according to conventional methods known in the art. For instance, the potato strips may be subjected to additional water immersion steps to further leach excess sugars or the strips may be treated with sodium acid pyropbosphate (SAPP), a chelating agent used to prevent discoloration of the strips. Dextrose (corn sugar) may also be applied to the surface of the strips in order to yield a desired level of brown color development during subsequent processing. Other treatments known in the art may also be used.

After blanching and the optional treatments described above, the potato strips are drained and partially dehydrated to reduce the moisture content to no lower than about 60%. Any of the conventional drying procedures used in the production of par-fried potato strips may be used, such as, for example, subjecting the potato strips to heated air at temperatures of from about 150° F. (65.6° C.) to about 350° F. (176.7° C.) for from about 5 to about 20 minutes. Optionally, the potato strips may be dehydrated by heating in a forced air convection oven or an impingement oven or by heating in a combination microwavelforced air convection oven. Microwave or radio-frequency drying may also used.

Dehydration may also be accomplished by other methods known in the art used to produce conventional par-fries, e.g., frying at temperatures of from 300° F. (148.9° C.) to 390° F. (198.9° C.). During dehydration of the strips the moisture content of the potato strip is reduced to a level not less than about 60%. Any combination of the above listed dehydration processes may be used; e.g., partial drying of potato strips with hot air followed by parfrying of the strips in oil at a temperature of about 365° F. (185° C.) for about 30 to about 60 second to yield parfried potato strips comprising about 60% to about 70% moisture. Each of these steps are well known in the art and discussed in detail in the Potato Processing, published in 1975 by the A.V.I. Publishing Co., Inc., Westport, Conn., and edited by W. F. Talbert and O. Smith.

The dehydrated potato strips comprising not less than about 60% moisture may be subjected immediately to the next parfying step or they may be cooled, chiled or frozen prior to the next processing step. Methods for chilling and/or freezing potato strips are well known in the art. For example, the strips may be subjected to a blast of cold air at a temperature of less than about −20° F. (−28.9° C.), immersed in a liquid refrigerant such as liquid nitrogen or contacted with a liquid refrigerant which is at a temperature below 0° F. (−17.8° C.), preferably below −20° F. (−28.9° C.). One may also use any of the fluorocarbons which exist in the liquid state. Particularly preferred is the use of liquid nitrogen.

The time required to achieve the desired degree of chilling or fang will vary depending on such factors as the temperature of the refrigerant, the size of the potato strips, etc. The freezing may either be a surface freeze or a total freeze. It is not essential that the surface freeze be accomplished by the use of a liquid refrigerant one may use a refrigerant in a gaseous state. For example, the par-fried potato strips may be subjected to a current of cold air at a temperature below 0° F. (−17.8° C.). A convenient method is to use a conventional blast freezer or a high velocity current of air where the potato strips are subjected to a blast of cold air at a temperature of less than or equal to about −20° F. (−28.9° C.). Alternatively, the potato strips may be placed in a freezer compartment, for example, at −10° F. (−23.3° C.), of a suitable size such as a commercial or industrial unit.

Par Frying

The dehydrated potato strips comprising not less than about 60% moisture are next fried in edible oil at a temperature of from about 270° F. to about 335° F. (132° C. to about 168° C.) for a time sufficient to reduce the moisture of the potato strips to a final moisture content of from about 38% to about 58%. Preferably, this frying step is conducted at an oil temperature of about 280° F. to about 320° F. (138° C. to about 160° C.), most preferably at about 290° F. to about 310° F. (143° C. to about 154° C.). Any variety of edible fats and oils may be used to par-fry the potato strips. The dehydration and par-frying may be accomplished in a single fry process, whereby the blanched potato strips are immersed in oil at temperatures of from about 270° F. to about 335° F. (132° C. to about 168° C.) for a time sufficient to reduce the moisture of the potato strips to from about 38% to about 58%. Other frying techniques may also be used, such as a heated oil spray which surrounds the potato strip with hot oil or frying using an oil foam.

Dehydration and par-frying may also be accomplished in a two fry process wherein the potato strips may be cooled, chilled or frozen before entering the second par-fryer. The blanched potato strips, which may have been partially dried with hot air are fried in the first fryer at a higher oil temperature than that of the second. The temperature of the first fryer ranges from about 300° F. to about 390° F. (148.9° C. to about 198.9° C.), while the par-frying time may range from about 10 to about 120 seconds or a time sufficient to reduce the moisture content of the potato strips to not less than about 60%. Following the first par-frying, the potato strips may be cooled, chilled or frozen. Cooling, chilling or freezing is conducted by any suitable method known in the art to reduce the temperature of the potato strips.

The par-fried potato strips comprising not less than about 60% moisture are then par-fried once again in a second fryer where the oil temperature ranges from about 270° F. to about 335° F. (132° C. to about 168.3° C.), while the par-frying time ranges from about 60 seconds to about 360 seconds or a time sufficient to reduce the moisture content of the potato strips to from about 38% to about 58%. The actual time required for any given frying step is determined by several factors; including the specific oil temperature, dimensions and temperature of the potato strips, the batch size, volume of the frying kettle, and initial moisture content of the potato strips.

Optionally, the par-fries of the present invention comprising 38% to 58% moisture may be prepared using commercially available par-fries comprising at least 60% moisture. It must be remembered that these commercially prepared par-fries may have been subjected to multiple processing steps (i.e., par-fry and freezing, multiple par-fryings and freezing). Therefore, when using commercially prepared par-fried potato strips it is critical that the par-fries have a moisture content greater than or equal to 60% prior to subsequent frying in oil having a temperature of about 270° F. to about 335° F. (132° C. to about 168.3° C.), to reduce the par-fries to a final moisture content of from about 38% to about 58%.

The par-fries of the present invention have a bulk moisture of about 38% to about 58% and a fat level of about 6% to about 25%. Preferably, the par-fried potato strips have from about 40% to about 56% bulk moisture, more preferably about 42% to about 54% moisture, even more preferably about 44% to about 50% bulk moisture. Preferably, the par-fried potato strips have from about 8% to about 22% total fat, more preferably from about 10% to about 20% total fat, and most preferably from about 12% to about 18% total fat.

Edible Oils

The edible oils used for par-frying the potato strips include natural or synthetic fats and oils. The oils may be partially or completely hydrogenated or modified otherwise. Edible fats and oils suitable for use include but are not limited to beef tallow, lard, cottonseed oil, soybean oil, corn oil palm oil, canola oil, fish oil, safflower oil sunflower oil, coconut oil, peanut oil, medium chain triglycerides, structured triglycerides containing a combination of short or medium chain fatty acids and long chain fatty acids (e.g. Caprenin-like) and the like or combinations thereof. If desired the oils may be conditioned or flavored, see *Flavored Vegetable Oils as a Substitute for Beef Tallow in Deep Frying Applications*, Food Technology, pp. 90–94 (1989) and U.S. Pat. No. 5,104,678 (Yang et al.).

Additionally non-toxic, fatty materials having properties similar to triglycerides such as sucrose polyesters and Olean™, from the Procter and Gamble Company, and reduced calorie fats, polyol fatty acid polyesters, and diversely esterified polyol polyesters or combinations of regular fats and fat substitutes may also be used herein.

Preferably the edible fat or oil used for par-frying the potato strips has a free fatty acid level no greater than about 0.8%.

One reduced calorie fat that has been found to be useful comprises a fairly high level (e.g., at least about 85%) of combined MML and MLM triglycerides, where M is typically a mixture of $C_8$–$C_{10}$ saturated fatty acids and L is predominantly behenic acid, but can be $C_{20}$–$C_{24}$. See U.S. Pat. No. 4,888,196 to Ehrman et al., issued Dec. 9, 1989 and U.S. Pat. No. 5,288,512 issued to Seiden, Feb. 22, 1994 for the synthesis and more detailed description of these reduced calorie fats.

The MML, LLM, triglycerides are further characterized by having a fatty acid composition which comprises from about 35% to about 60% combined $C_8$–$C_{10}$ saturated fatty acids, a ratio of $C_8$–$C_{10}$ saturated fatty acids of from about 1:5 to about 25:1, and from about 35% to about 60% behenic fatty acid.

By "reduced calorie" as used herein is meant fats that provide an at least about 10%, and preferably an at least about 30%, reduction in calories relative to corn oil. The reduction in calories provided by these reduced calorie fats can be determined by studies similar to that described by Peters, J. C. et al., *Journal of the American College of Toxicology*, Vol. 10, No. 3, 1991, pp. 357–367.

By "polyol" is meant a polyhydric alcohol containing at least 4, preferably from 4 to 11 hydroxyl groups. Polyols include sugars (i.e., monosaccharides, disaccharides, and trisaccharides), sugar alcohols, other sugar derivatives (i.e., alkyl glucosides), polyglycerols such as diglycerol and triglycerol, pentaerythritol and polyvinyl alcohols. Specific examples of suitable sugars, sugar alcohols and sugar derivatives include xylose, arabinose, ribose, xylltol, erythritol, glucose, methyl glucoside, mannose, galactose, fructose, sorbitol, maltose, lactose, sucrose, raffinose, and maltotriose.

By "polyol fatty acid polyester" is meant a polyol having at least 4 fatty acid ester groups. Polyol fatty acid esters that contain 3 or less tatty acid ester groups are generally digested in, and the products of digestion are absorbed from, the intestinal tract much in the manner of ordinary triglyceride fats or oils, whereas those polyol fatty acid esters containing 4 or more fatty acid ester groups are substantially nonigestible and consequently non-absorbable by the human body. It is not necessary that all of the hydroxyl groups of the polyol be esleied, but it is preferable that disaccharide molecules contain no more than 3 unesterified hydroxyl groups for the purpose of being non-digestible. Typically, substantially all, e.g., at least about 85%, of the hydroxyl groups of the polyol are esterified. In the case of sucrose polyesters, typically from about 7 to 8 of the hydroxyl groups of the polyol are esterified.

The polyol fatty acid esters typically contain fatty acid radicals typically having at least 4 carbon atoms and up to 26 carbon atoms. These tatty acid radicals can be derived from naturally occurring or synthetic fatty acids. The fatty acid radicals can be saturated or unsatutated, including positional or geometric isomers, e.g., cis- or trans-isomers, and can be the same for all ester groups, or can be mixtures of different fatty acids.

Liquid non-digestible oils have a complete melting point below about 98.6° F. (37° C.) include liquid polyol fatty acid polyesters (see Jandacek; U.S. Pat. No. 4,005,195; Issued Jan. 25, 1977); liquid esters of tricarballylic acids (see Hamm; U.S. Pat. No. 4,508,746; Issued Apr. 2, 1985); liquid diesters of dicarboxylic acids such as derivatives of malonic and succinic acid (see Fulcher, U.S. Pat. No. 4,582,927; Issued Apr. 15, 1986); liquid triglycerides of alpha-branched chain carboxylic acids (see Whyte; U.S. Pat. No. 3,579,548; Issued May 18, 1971); liquid ethers and ether esters containing the neopentyl moiety (see Minich; U.S. Pat. No. 2,962,419; Issued Nov. 29, 1960); liquid fatty polyethers of polyglycerol (See Hunter et al; U.S. Pat. No. 3,932,532; Issued Jan. 13, 1976); liquid alkyl glycoside fatty acid polyesters (see Meyer et al; U.S. Pat. No. 4,840,815; Issued Jun. 20, 1989); liquid polyesters of two ether linked hydroxypolycarboxylic acids (e.g., citric or isocitric acid) (see Huhn et al; U.S. Pat. No. 4,888,195; Issued Dec. 19, 1988); liquid esters of epoxide-extended polyols (see White et al; U.S. Pat. No. 4,861,613; Issued Aug. 29, 1989); all of which are incorporated herein by reference, as well as liquid polydimethyl siloxanes (e.g., Fluid Silicones available from Dow Corning).

The polyol fatty acid polyesters that are liquid have minimal or no solids at a temperature of 98.6° F. (37° C.), i.e., body temperatures. These liquid polyol polyesters typically contain fatty acid ester groups having a high proportion of $C_{12}$ or lower fatty acid groups or else a high proportion of $C_{18}$ or higher unsaturated fatty acid groups. In the case of those liquid polyol polyesters having high proportions of unsaturated $C_{18}$ or higher fatty acid groups, at least about half of the fatty acids incorporated into the polyester molecule are typically unsaturated.

The liquid polyol fatty acid polyesters can be prepared by a variety of methods known to those skilled in the art. These methods include: transesterification of the polyol (i.e. sugar or sugar alcohol) with methyl, ethyl or glycerol fatty acid esters using a variety of catalysts; acylation of the polyol with a fatty acid chloride; acylation of the polyol with a fatty acid anhydride; and acylation of the polyol with a fatty acid, per se. See, for example, U.S. Pat. Nos. 2,831,854, 3,600, 186, 3,963,699, 4,517,360 and 4,518,772, all of which are incorporated by reference, which disclose suitable methods for preparing polyol fatty acid polyesters. Specific, but non-limiting, examples of the preparation of liquid polyol polyesters suitable for use in the practice of the present invention are disclosed in Young et al; World Patent Application US91-02394 (publication number WO91-15964); published Oct. 31, 1991, which is incorporated by reference. The liquid polyol polyesters can contain behenic acid.

Polyol fatty acid polyesters that are solid at temperatures of about 98.6° F. (37° C.) and higher have the ability to bind high levels of edible liquid nonigestible oils, such as liquid polyol polyesters previously described, when included in appropriate amounts. This capacity to bind liquid nondigestible oils enables these solid polyol polyesters to control or prevent the passive oil loss problem associated with the ingestion of such liquid oils.

Diversely Esterified Polyol Polyesters

One preferred class of suitable solid polyol polyesters for use in the liquid/solid blend are those wherein the esters groups comprise a combination of (a) $C_{12}$ or higher unsaturated fatty acid radicals, $C_4$–$C_{12}$ fatty acid radicals or mixtures thereof, and (b) at least about 15% $C_{20}$ or higher saturated fatty acid radicals, preferably at least about 30%, more preferably at least about 50%, most preferably at least about 80%, long chain saturated fatty acid radical.

Suitable unsaturated fatty acid radicals contain at least 12, preferably from 12 to 26, more preferably from 18 to 22, most preferably 18, carbon atoms. Suitable short chain saturated fatty acid radicals contain from 4 to 12, preferably from 6 to 12, and most preferably from 8 to 12, carbon atoms. Suitable long chain saturated fatty acid radicals contain at least 20, preferably from 20 to 26, most preferably 22, carbon atoms. The long chain unsaturated fatty acid radicals can be used singly or in mixtures with each other, in all proportions, as is also the case with the short chain and long chain saturated fatty acid radicals. In addition, straight chain (i.e. normal) fatty acid radicals are typical for the short chain and long chain saturated fatty acid radicals, as well as the long chain unsaturated fatty acid radicals. Examples of suitable long chain unsaturated fatty acid radicals for use in these solid polyol polyesters are monounsaturated radicals such as lauroleate, myristoleate, pahnitoleate, oleate, elaidate, and erucate, and polyunsatiiated radicals such as linoleate, arachidonate, linoleate, eicosapentaenoate, and docosahexaenoate. In terms of oxidative stability, the monounsaturated and diunsaturated fatty acid radicals are preferred. Examples of suitable short chain saturated fatty acid radicals are acetate, butyrate, hexanoate (caproate), ocnoate (caprylate), decanoate (caprate), and dodecanoate (laurate). Examples of suitable long chain saturated fatty acid radicals are eicosanoate (arachidate), docosanoate (behenate), tetracosanoate (lignocerate), and hexacosanoate (cerotate).

Mixed fatty acid radicals from oils which contain substantial amounts of the desired long chain unsaturated fatty acids, short chain satfurted tatty acids, or long chain saturated fatty acids can be used as sources of fatty acid radicals in preparing the solid polyol polyesters useful in the liquid/ solid blend type of non-digestible fat component The mixed fatty acids from such oils should preferably contain at least about 30% (more preferably at least about 50%, most preferably at least about 80%) of the desired long chain unsaturated, short chain saturated or long chain saturated fatty acids. For example, palm kernel oil fatty acids can be used instead of a mixture of the respective pure saturated fatty acids having from 8 to 12 carbon atoms. Similarly, rapeseed oil fatty acids or soybean oil fatty acids can be used instead of a mixture of the respective pure monounsaturated and polyunsaturated fatty acids having 12 to 26 carbon atoms, and hardened (i.e., hydrogenated) high erucic rapeseed oil fatty acids can be used in place of a mixture of the respective pure long chain saturated fatty acids having from 20 to 26 carbon atoms. Preferably, the $C_{20}$ or higher saturated fatty acids (or their derivatives, e.g. methyl esters) are concentreted, for example, by distillation. An example of source oils for these solid polyol polyesters are high oleic sunflower oil and substantially completely hydrogenated high erucic rapeseed oil. When sucrose is substantially completely esterified with a 1:3 by weight blend of the methyl esters of these two oils, the resulting polyester has a molar ratio of unsaturated $C_{18}$ acid radicals to saturated $C_{20}$ or higher acid radicals of about 1:1, the saturated $C_{20}$ and $C_{22}$ acid radicals being about 28.6% of the total fatty acid radicals. The higher the proporgdon of the desired long chain unsaturated/short chain saturated and long chain saturated fatty acids in the source oils used in making the solid polyol polyesters, the more efficient the polyesters will be in their ability to bind the liquid non-digestible oils.

The molar ratio of (a) long chain unsaturated fatty acid radicals or short chain fatty acid radicals or mixtures thereof, to (b) long chain saturated fatty acid radicals, is from about 1:15 to about 1:1. Preferably, this molar ratio of (a) to (b) radicals is from about 1:7 to about 4:4, most preferably from about 1:7 to about 3:5.

Examples of solid polyol fatty acid polyesters containing mixtures of (a) and (b) radicals include sucrose tetrabehenate tetracaprylate, sucrose pentabehenate trilaurate, sucrose hexabehenate dicaprylate, sucrose hexabehenate dilaurate, the sorbitol hexaester of palmitoleic and arachidic fatty acid radicals in a 1:2 molar ratio, the raffinose octaester of linoleic and behenic fatty acid radicals in a 1:3 molar ratio, the maltose heptaester of a mixture of sunflower oil and lignoceric fatty acid radicals in a 3:4 molar ratio, the sucrose octaester of oleic and behenic fatty acid radicals in a 2:6 molar ratio, the sucrose octaester of lauric, linoleic and behenic fatty acid radicals in a 1:3:4 molar ratio, and the sucrose hepta- and octaesters of $C_{18}$ mono- and/or di-unsaturated fatty acid radicals and behenic fatty acid radicals in a molar ratio of Flavoring agents, such as salt, pepper, butter, onion, or garlic may be added to the oil to enhance the flavor or modify the flavor to any desired taste. One skilled in the art will readily appreciate that the aforementioned listing of flavoring agents is in no way exhaustive, but is merely suggestive of the wide range of additives which are suitable for use in the practice of the present invention.

Other ingredients known in the art may be added to the edible fats and oils used for par-frying the potato strips, including but not limited to antioxidants (e.g. tocopherols and TBHQ), chelating agents (e.g. citric acid) and anti-foaming agents (e.g. dimethylpolysiloxane).

After par-frying the potato strips are chilled or frozen. Chilling or freezing of the par-fries may be accomplished by methods known in the art.

The step of contacting the refrigerant with the par-fried potato strips may be accomplished by dipping the strips in a pool of the refrigerant, or by spraying the refrigerant on them. In any case, the time of contact is limited so that preferably only the surface layers of the strips become frozen. The time required to achieve the desired degree of freezing will vary depending on such factors as the temperature of the refrigerant, the size of the potato strips etc. The freezing may either be a surface freeze or a total freeze. It is not essential that the surface freeze be accomplished by the use of a liquid refrigerant; one may use a refrigerant in a gaseous state. For example, the par-fried potato strips may be subjected to a current of cold air at a temperature below 0° F. (−17.8° C.). A convenient method is to use a conventional blast freezer or a high velocity current of air where the potato strips are subjected to a blast of cold air at a temperature of less than or equal to about −20° F. (−28.9° C.). Alternatively, the potato strips may be placed in a freezer compartment, for example, at −10° F. (−23.3° C.), of a suitable size such as a commercial or industrial unit.

The frozen par-fried potato strips are then packed into tightly sealed, i.e., airtight, packages and stored at normal freezer temperatures of from about −20° F. (−28.9° C.) to about 10° F. (−12.2° C.). The containers may contain a large amount of the potato strips, i.e. a few pounds, or may be designed to hold a suitable serving size.

Additional steps may be practiced within the process of the invention without departing from the spirit and scope of the invention. For instance the par-fries may be treated by methods known in the art, for example, coated with a film forming hydrocoloid, starch, potato flour, enrobed in oil or treated with a starch or calcium solution.

The time and temperature for baking the par fried potato strips of the present invention will vary depending upon the quantity of strips, their initial temperature, the type of oven and the oven conditions, and the thermal properties of the prebaked par fries. Of particular importance are the thermal conductivity of the low-moisture crust region, the thermal conductivity of the high-moisture interior starch-matrix core, and the surface heat transfer coefficient of the prebake fry. In general, higher thermal conductivities and higher surface heat transfer coefficients will result in more rapid transfer of heat from the oven to and through the fry, resulting in reduced cooking time. Since it is an object of the present invention to provide a fast food process for quickly finishing frozen par-fries in an oven, these properties are of particular importance. The desirable thermal conductivities at oven temperature of the low moisture crust region in the prebake fry are from about 0.1 to about 0.3 watt/m−° C. The desirable thermal conductivities at oven temperature of the high moisture core region in the prebake fry are from about 0.4 to about 0.7 watts/m−° C. The thermal conductivity of the crust region can be adjusted to the desirable range by controlling the level of moisture and fat in the crust.

The surface heat transfer coefficient of the par fry is a function of air velocity, air temperatere, and the nature of the oil filn at the surface of the par fry. Higher surface heat transfer coefficients are desirable since this will generally lead to faster cooking time, and the formation of more distinct and crisp low moisture crust region in the oven-finished French fry. The desirable surface heat transfer coefficients at oven temperature of the prebake fry in the oven are from about 50 to about 400 watts/m$^{2-°}$ C. The surface heat transfer coefficient is increased as a consequence of enrobing the parfried potato strips with an edible fat or oil, which increases the conduction of heat from the surrounding air to the fry surface. The surface of the prebake fry may also be modified to improve the absorption of radiant heat from the oven. A typical method of accomplishing this would be to alter the color, porosity, and or reflectivity of the surface. Increasing the velocity of the oven air at the surface of the par fry will also increase the surface heat transfer coefficient The oven air velocity should be high enough to achieve a satisfactory heat transfer coefficient, but not so high as to strip away any of the surface modiing agent previously described.

ANALYTICAL PROCEDURES

The methods for determining the bulk moisture and total fat of par-fried potato strips and oil enrobed par-fried potato strips are set forth below:

Determination of Bulk Moisture Content

Moisture content is determined by a forced air oven method as follows:

1. Uniformly grind up a representative sample of potato strips in a blender or conventional food processor.
2. Accurately weigh approximately 5 grams of ground sample (weight "A") into a previously tarred metal pan or dish.
3. Place the metal dish containing the sample in a forced air convection oven at 105° C. for 2 hours.
4. After 2 hours, remove the metal dish containing the dried sample and allow to cool to room temperature in a desiccator over a desiccant such as anhydrous calcium sulfate.
5. Re-weigh the dish containing the dried sample and calculate the weight of the dried sample (weight "B") by subtracting the dish tare weight.
6. Calculate the percent moisture of the sample as follows:

$$\% \text{ Moisture}=[(A-B)/(A)]\times 100$$

Determination of Total Fat Content

Total fat content is determined by a solvent extraction method as follows:

Apparatus

1. Soxtec HT6 extraction system; unit includes heating block and cooling condenser.
2. Recirculating water bath for cooling condenser.
3. Recirculating oil bath for heating block.
4. Extraction beakers.
5. Extraction thimbles, 26 mm (Fisher, TC15220018)
6. Nitrogen purging gas
7. Vacuum drying oven
8. Analytical balance (4 place)
9. Dispensing pipette (50 ml)

Materials

1. Methylene chloride (Baker 9315-33)
2. Boiling stones (Chemware PTFE Fisher 09-191-20)
3. Silicone oil (Fisher TC$_{1000}$-2779)
4. Glass wool (Fisher 11-390)

Procedure

1. Uniformly grind a representative sample of potato strips in a blender or conventional food processor.
2. Accurately weigh (to four places) a piece of glass wool (sufficient in size to contain sample pieces in the thimble) and the extraction thimble; record weight of thimble+glass wool (weight "A").
3. Load the ground sample into the thimble and cap the loaded thimble with the pre-weighed piece of glass wool.
4. Accurately weigh (to four places) and record the weight of the ground sample, thimble, +glass wool (weight "B").
5. Place two or more boiling stones into an extraction beaker and weigh (to four places), record weight of extraction beaker+boiling stones (weight "C").
6. Place loaded thimbles on the extraction unit and raise the thimbles to rinse position.
7. Pipette 50 ml of methylene chloride into each pre-weighed extraction beaker with boiling stones.
8. Set oil heating bath to 100° C. and water cooling bath to 28.3° C. and allow temperatures to equilibrate.

9. Lower the loaded thimbles into the extraction beaker containing the solvent and allow to boil in the solvent for 60 minutes with the condenser's pet cock in the open position.
10. Raise the thimbles to the rinsing position and rinse for 60 minutes.
11. Turn the condenser's pet cock to the closed position and allow the solvent to evaporate for 60 minutes. Turn the nitrogen purging gas on to aid the evaporation.
12. Transfer the beaker to a vacuum oven, pre-warnied to 120° C., for 30 minutes at full vacuum.
13. Allow the beaker to cool to room temperature and weigh (to four places); record the weight of the beaker+ boiling stones+extracted fat (weight "D").
14. Calculate percent total fat as follows:

% Fat=[(D−C)/(B−A)]×100

Accordingly, the disclosed embodiments are considered in all respects to be illustrative and not restrictive. The scope of the invention is indicated by the appended claims.

EXAMPLE 1

Frozen commercial shoestring-cut par-fried potato strips are an acceptable starting product (e.g., Simplot Par-Fries; J. R. Simplot Co., Caldwell, Id.). A typical processing history may include: sorted and graded Russet Burbank potatoes are peeled, washed, trimmed and cut axially into shoestring strips (0.25 inch square cross-section). The potato strips are blanched in hot water or steam and partially dried with hot air such that the potato strips are reduced in weight by about 15%. The partially dried strips are then par-fried in partially-hydrogenated soybean oil (Iodine Value of about 67) for about 50 seconds at an oil temperature of about 375° F. (190.5° C.). The par-fried potato strips are then cooled and frozen in a blast freezer at −30° F. (−34.4° C.) and packaged. The par-fried potato strips have a moisture content of about 64% and a fat content of about 6%.

About 1 lb. of the packaged frozen par-fried potato strips are further processed by frying a second time in a 45 lb. oil capacity foodservice frying kettle containing Primex 108 vegetable oil (blend of partially hydrogenated soybean oil and corn oil available from the Procter & Gamble Co.) for about 3 minutes at a temperature of about 290° F. (143.3° C.). The resulting par-fries are immediately frozen by immersion in liquid nitrogen for 20 seconds, packaged in foil laminate bags, and stored at normal freezer temperatures of approximately 0° F. (−17.8° C.). The par-fries have about 47% moisture and about 15% fat and can be stored for several months at 0° F. (−17.8° C.) without developing objectionable off-flavors.

EXAMPLE 2

A non-digestible fat composition is used to prepare the par-fried potato strips in the following example. The non-digestible fat composition is Olean™, from the Procter & Gamble Company, which comprises a blend of liquid and solid sucrose polyester. Sorted and graded Russet Burbank potatoes are peeled, washed, trimmed and cut axially into shoestring strips (0.25 inch square cross-section). The potato strips are blanched in hot water or steam and partialy dried with hot air such that the potato strips are reduced in weight by about 15% . The partially dried strips are then par-fried in Olean™ for about 60 seconds at an oil temperature of about 375° F. (190.5° C.). The par-fried potato strips are then cooled and frozen in a blast freezer at −30° F. (−34.4° C.) and packaged. The par-fried potato strips have a moisture content of about 64% and a fat content of about 8%.

About 1 lb. of the packaged frozen par-fried potato strips are further processed by frying a second time in a 45 lb. oil capacity foodservice frying kettle containing Olean™ for about 3 minutes at a temperature of about 300° F. (149° C.). The resulting par-fried potato strips are immediately frozen by immersion in liquid nitrogen for 20 seconds, packaged in foil laminate bags, and stored at normal freezer temperatures of approximately 0° F. (−17.8° C.). The par-fried potato strips have about 46% moisture and about 20% fat and can be stored for several months at 0° F. (−17.8° C.) without developing objectionable off-flavors.

EXAMPLE 3

Atlantic variety potatoes are peeled, washed. and cut into shoestring strips (0.25 inch square cross-section). The potato strips are blanched in hot water at about 175° F. (79.4° C.) for 8 minutes. Surface water is removed from the blanched potato strips by blotting with paper towels and then the potato strips are fried in Primex Formula 108 vegetable oil (blend of partially hydrogenated soybean oil and corn oil; available from the Procter & Gamble Company) for 8 minutes at an oil temperature of 270° F. (132.2° C.). The par-fried potato strips are then frozen by immersion in liquid nitrogen for 20 seconds, packaged in foil laminate bags, and stored at 0° F. (−17.8° C.). The par-fried potato strips have about 50% moisture and about 12% fat and can be stored for several months at 0° F. (−17.8° C.) without developing objectionable off-flavor.

EXAMPLE 4

Sorted and graded Russet Burbank potatoes are peeledt washed, trimmed and cut axially into shoestring strips (0.25 inch square cross-section). The potato strips are blanched in hot water or steam and then subjected to a blast of hot air to remove surface water, followed by partial drying in a hot air impingement oven such that the potato strips are reduced in weight by about 35%. The partially dried strips comprise about 70% moisture. The partially dried potato strips are then par-fried in Primex Formula 108 vegetable oil (blend of partially hydrogenated soybean oil and corn oil; available from the Procter & Gamble Company) for 3 minutes at an oil temperature of 335° F. (162.8° C.). The par-fried potato strips are then frozen by immersion in liquid nitrogen and packaged. The par-fried potato strips have a moisture content of about 44% and a fat content of about 15%.

What is claimed:

1. A process of preparing par-fried potato strips for oven reheating that are flavor stable when stored at about 0° F. (−17.8° C.) to about 20° F. (−6.7° C.) for at least 1 month comprising the steps of:
    (a) reducing the moisture content of potato strips to a moisture content of not less than about 60%;
    (b) par-frying the reduced moisture content potato strips in oil at a temperature of about 270° (132° C.) to about 335° F. (168.3° C.) for a time sufficient to further reduce the moisture content of the potato strips to a moisture content of from about 38% to about 50%; and
    (c) freezing the partially fried potato strips.
2. The process of claim 1 wherein the potato strips are fried in oil at a temperature of about 290° F. (143.3° C.) to about 310° F. (154.4° C.) to a moisture content of about 42% to about 50%.
3. The process of claim 1 wherein the moisture content of the potato strips is reduced in step (a) by frying the potato strips in oil at a temperature of from about 270° F. (132° C.) to about 385° F. (196° C.).

4. The process of claim 3 wherein the oil used in par-frying has 0.8% or less free fatty acids.

5. The process of claim 1 wherein the moisture content of the potato strips is reduced in step (a) by heating the potato strip in a forced air oven or in an impingement oven or by heating in a combination microwave/forced air oven or in a combination infrared/forced air oven.

6. The process of claim 1 wherein the par-frying step (b) is preceded by chilling or freezing the reduced moisture content potato strips from step (a) at a temperature below 0° F. (−17.8° C.).

7. The process of claim 1 wherein the oil used in par-frying has 0.8% or less free fatty acids.

8. A process of preparing par-fried potato strips for oven reheating that are flavor stable when stored at about 0° F. (−17.8° C.) to about 20° F. (−6.7° C.) for at least 1 month comprising the steps of:

(a) partially frying commercially prepared par-fried potato strips comprising at least about 60% moisture in oil at a temperature of about 270° F. (132° C.) to about 335° F. (168.3° C.) for a time sufficient to reduce the moisture content of the potato strips to a moisture content of from about 38% to about 50%; and (b) freezing the partially fried potato strips.

9. The process of claim 8 wherein the oil used in par-frying has 0.8% or less free fatty acids.

10. A process of preparing par-fried potato strips for oven reheating that are flavor stable when stored at about 0° F. (−17.8° C.) to about 20° F. (−6.7° C.) for at least 1 month comprising the steps of:

(a) par-frying potato strips having a moisture content of at least about 60% moisture in oil at a temperature of about 270° F. (132° C.) to about 335° F. (168.3° C.) for a time sufficient to reduce the moisture content of the potato strips to a moisture content of from about 38% to about 50%; and (b) freezing the partially fried potato strips.

11. The process of claim 10 wherein the potato strips are fried in oil at a temperature of about 290° F. (143.3°) to about 310° F. (154.4° C.) to a moisture content of about 42% to about 50%.

12. The process of claim 10 wherein the oil used in par-frying has 0.8% or less free fatty acids.

* * * * *